United States Patent
Gindorf et al.

(10) Patent No.: US 10,201,845 B2
(45) Date of Patent: Feb. 12, 2019

(54) METHOD FOR MANUFACTURING BRUSH SEALS WITH OBLIQUELY POSITIONED BRISTLES AND A CORRESPONDING DEVICE

(71) Applicant: MTU Aero Engines AG, Munich (DE)

(72) Inventors: Alexander Gindorf, Schwabhausen (DE); Roland Huttner, Jesenwang (DE); Martin Fessler-Knobel, Munich (DE); Julian Weber, Munich (DE); Christoph Cernay, Bruckmuehl (DE)

(73) Assignee: MTU Aero Engines AG, Munich (DE)

( * ) Notice: Subject to any disclaimer, the term of this patent is extended or adjusted under 35 U.S.C. 154(b) by 229 days.

(21) Appl. No.: 15/131,350

(22) Filed: Apr. 18, 2016

(65) Prior Publication Data
US 2016/0327160 A1    Nov. 10, 2016

(30) Foreign Application Priority Data
May 5, 2015    (DE) .......................... 10 2015 208 224

(51) Int. Cl.
*F16J 15/32*    (2016.01)
*B21F 45/00*    (2006.01)
(Continued)

(52) U.S. Cl.
CPC ............... *B21F 45/00* (2013.01); *B21F 3/00* (2013.01); *F16J 15/3288* (2013.01); *A46D 1/0207* (2013.01)

(58) Field of Classification Search
CPC ...... F16J 15/3288; F16J 15/328; F16J 15/322; F05D 2240/56; F05D 2240/55; F05D 2220/30; F05D 2220/32; F05D 2220/36; Y10T 29/49297; Y10T 29/49895; Y10T 29/4932; F01D 11/001; F01D 11/00; F01D 11/005; F01D 11/08; A46D 3/05; A46D 3/045; A46D 3/042; A46D 3/04;
(Continued)

(56) References Cited

U.S. PATENT DOCUMENTS 2,449,668 A    9/1948  Peterson
3,917,150 A *  11/1975 Ferguson .............. F01D 11/001
                                                  228/159
(Continued)

FOREIGN PATENT DOCUMENTS

DE    3606284 A1    5/1987
DE    19641375 C1   12/1997
(Continued)

*Primary Examiner* — Jun S Yoo
(74) *Attorney, Agent, or Firm* — Barlow, Josephs & Holmes, Ltd.

(57) ABSTRACT

The invention relates to a device and a corresponding method for manufacturing brush seals with obliquely positioned bristles. The method comprises the following steps: As the first step, a metal filament or wire (50) comprising a material for bristles is wound over two wire cores (42, 46) disposed at a distance from and running parallel to one another, to form a tightly packed metal filament or wire package (48). As the next step, the metal filament or wire package (48) is fastened to at least one wire core (42, 46). Then the region around at least one of the two wire cores (42, 46) is locally heated. Subsequently, at least one of the two wire cores (42, 46) is displaced.

9 Claims, 2 Drawing Sheets

(51) Int. Cl.
*B21F 3/00* (2006.01)
*F16J 15/3288* (2016.01)
*A46D 1/00* (2006.01)

(58) Field of Classification Search
CPC ......... A46D 1/0207; A46B 3/08; B21F 45/00; F21F 3/00
See application file for complete search history.

(56) References Cited

U.S. PATENT DOCUMENTS

| | | | | |
|---|---|---|---|---|
| 4,204,629 | A | * | 5/1980 | Bridges .................... A46D 3/05 228/160 |
| 4,730,876 | A | * | 3/1988 | Werner .................... A46D 3/05 140/92.2 |
| 2002/0190473 | A1 | | 12/2002 | Tong et al. |
| 2007/0214628 | A1 | | 9/2007 | Adis et al. |
| 2011/0227289 | A1 | * | 9/2011 | Stefan .................. F16J 15/3288 277/355 |
| 2011/0272891 | A1 | | 11/2011 | Adis et al. |
| 2017/0248234 | A1 | * | 8/2017 | Lutjen .................. F01D 11/003 |

FOREIGN PATENT DOCUMENTS

| | | |
|---|---|---|
| DE | 19746184 A1 | 4/1999 |
| DE | 10250160 A1 | 6/2003 |
| DE | 10163729 A1 | 7/2003 |
| DE | 10315105 B3 | 8/2004 |
| DE | 102007014843 A1 | 1/2008 |
| EP | 0211275 A2 | 2/1987 |
| EP | 2789805 A1 | 10/2014 |

* cited by examiner

METHOD FOR MANUFACTURING BRUSH SEALS WITH OBLIQUELY POSITIONED BRISTLES AND A CORRESPONDING DEVICE

BACKGROUND OF THE INVENTION

The invention relates to a method for manufacturing brush seals with obliquely positioned bristles as disclosed herein. The invention further relates to a device for manufacturing brush seals with obliquely positioned bristles according to the present invention.

The manufacture of brush seals with obliquely positioned metal bristles is known, for example, from the publication DE 36 06 284 C2. In this case, a metal filament or wire is wound around two wire cores disposed at a distance and parallel to one another, to form a tightly packed metal filament or wire package. Subsequently, the metal filament or wire package is fixed to the corresponding wire core by means of a clamping strip. The clamping strips are then displaced parallel to one another by means of a frame at room temperature. Large forces are necessary for this displacement. In this case, the bristles in the vicinity of the wire cores bend and the so-called lay angle is applied. In order to fix the lay angle of the bristles, the brush seal must be subjected to a heat treatment. In this case, the approximately 30-kg frame with clamped brush seal is relieved of stress in an oven for a period of one hour at a temperature between 500° C. and 1000° C. In this process, the frame wears out and must be regularly changed. Due to the wear on the frame, in addition, a rolling process is necessary for adjusting the correct outer diameter of the clamping strip both before and after the heat treatment. This has the disadvantage that additional manufacturing steps are necessary and brush seals are unnecessarily expensive in their manufacture.

SUMMARY OF THE INVENTION

Therefore, the object of the present invention is based on presenting a method for manufacturing brush seals with obliquely positioned bristles, wherein the method drastically shortens the heat treatment time and greatly reduces the deformation forces to be expended. Further, the object of the present invention is based on presenting a corresponding device.

The object is achieved by the method and device of the present invention.

The invention relates to a method for manufacturing brush seals with obliquely positioned bristles. The method comprises the following steps. First, in step a.), a metal filament or wire comprising a material for bristles is wound around two wire cores disposed at a distance from and running parallel to one another to form a tightly packed metal filament or wire package. Preferably, metal is used as a bristle material. Next, in step b.), the metal filament or wire package is fastened to at least one wire core. Then, in step c.), the region around at least one of the two wire cores is locally heated. Subsequently, in step d.), at least one of the two wire cores is displaced. The heating is preferably produced at a temperature of 500° C. to 1000° C. for a maximum of 15 min. The temperature region can lie between 700° C. and 800° C. or between 720° C. and 780° C. In this case, the heat treatment in step c.) is regarded as a step for relieving stress.

It should be noted that the heating step in step c.) basically takes place before, during, or even after the displacement in step d.), but preferably takes place before the displacement in step d.).

This method has the advantage that the entire frame structure does not need to be heated for the fastening of the brush seal. Consequently, it is heated here only locally at the required site. This saves a great deal of processing time.

In one embodiment of the invention, the fastening in step b.) can take place by welding or bonding, but particularly by form-fit joining.

In another advantageous embodiment of the invention, in step b.), the fastening takes place by crimping at least one clamping strip over at least one wire core. The clamping strip particularly involves a c-shaped tube. The outer diameter of the c-shaped tube adjusts the clamping force exercised on the bristles. Other geometries are also conceivable. The clamping strip may also have, for example, a square, rectangular, or polygonal outer geometry.

In another advantageous embodiment of the invention, after step b.) and before step d.), at least one wire core is fixed on a fastening jaw. Preferably, the one wire core is fixed on the one fastening jaw. And the other wire core is fixed on the other fastening jaw. This has the advantage that the metal filament or wire package disposed between the wire cores remains clamped, so that the individual bristles are aligned essentially parallel to one another in the metal filament or wire package.

In another advantageous embodiment of the invention, the heating in step c.) takes place by means of at least one induction coil disposed in at least one fastening jaw.

This has the advantage that an eddy current forms only in the wire core and/or in the clamping strip. The wire cores plus clamping strips are heated thereby and give off their heat to the immediate surroundings, e.g., the bristles. The "kink" of the bristles can be heated in a targeted manner and only locally with an induction coil. In particular, the temperature of 500° C. to 1000° C. is reached within a few minutes, whereby the temperature is recorded during the process of inductive heating and can be controlled individually if necessary.

For example, if an induction coil is only found in the fastening jaw on the left side, then also, only the bristles disposed in the left-side fastening jaw can be inclined and fixed. The bristles disposed in a fastening jaw on the right side (without induction coil) are not subjected to heat treatment, so that brush seals with and without inclined bristles can be manufactured simultaneously. The bristles without heat treatment bend back again into their initial radial position.

Preferably, each of the two fastening jaws has at least one induction coil. In particular, at least one of the two induction coils operates at a frequency in the eddy current. The eddy current frequency here can lie between 1 kHz and 50 kHz, for example.

It should be mentioned that the entire process described above and in accordance with the invention can be manually controlled, but control is also possible, in particular, by means of precise, fine-tuned and pre-set control and regulation of the process parameters.

In another advantageous embodiment of the invention, in step c.), the metal filament or wire package, at least one wire core, and/or at least one clamping strip are surrounded by a protective gas during the heating. This has the advantage that the metal brush seal cannot start working. In addition, the formation of undesired oxides is prevented.

In another advantageous embodiment of the invention, in step d.), at least one wire core is displaced within a wire plane, and/or perpendicular to a wire plane. Care should be taken during displacement that the wire cores always run parallel to one another. The wire plane results after step a.), whereby the two wire cores and the metal filament or wire package are disposed in one plane. In this case, it is advantageous not only to manufacture brush seals with obliquely positioned bristles in the peripheral direction, but also to manufacture brush seals with obliquely positioned bristles in the axial direction. In this way, the separating surfaces or applied surfaces of at least one pair of fastening jaws coincide.

In another advantageous embodiment of the invention, after step d.), the metal filament or wire or wire package, at least one wire core, and/or at least one clamping strip are cooled to room temperature. Preferably, the entire brush seal is cooled to room temperature, so that the oblique position of the bristles is fixed.

In another advantageous embodiment of the invention, after step d.), the metal filament or wire package found between the two wire cores is severed. Preferably, the severing is produced centrally, so that two identical brush seals can be manufactured simultaneously with this method. If the severing plane deviates from the central plane, then two brush seals with different bristle lengths can be manufactured simultaneously.

Due to the local heat treatment by means of inductive heating and clamping in ceramic fastening jaws, the method can be configured in such a way that the forces for bringing the brush wires into the desired position are introduced only with temperature. The main difference when compared to global heat treatment is the primary heating of the preferably c-shaped clamping strip and of the wire core by induction. The heating of the wire bristles is then produced secondarily by heat conduction at the site of the outlet from the clamping strip. In this way, the heating can be produced very rapidly and with little holding time. In this case, the holding forces for the production of the lay angle are clearly smaller than with subsequent heat treatment in the furnace.

The invention further relates to a device for manufacturing brush seals with obliquely positioned bristles. The device comprises at least two fastening jaws, wherein at least one fastening jaw has an uptake for a coil and an uptake for a brush, for fastening a portion of a brush. In this way, at least one fastening jaw has at least one coil uptake and at least one heat source that is disposed in the coil uptake.

In another advantageous embodiment of the invention, at least one fastening jaw is manufactured from a particularly high-strength ceramic material. This offers the advantage that the fastening jaws will barely absorb heat, so that also these jaws wear out less rapidly. In particular, in the case of a ceramic material, the heat source can be disposed very close to the brush uptake due to the poor heat conductivity. The brush uptake preferably has an inner diameter that corresponds to the outer diameter of the c-shaped clamping tube. Due to the hardly present wear of the ceramic material, pre-processing and post-processing of the clamping strip disposed around the wire core is also not necessary.

In another advantageous embodiment of the invention, at least one stop element is disposed between the two fastening jaws. Alternatively or in combination therewith, the two fastening jaws are joined together via a parallel guide. For example, the parallel guide can be implemented by means of a biaxial movement of a mechanical and/or hydraulic drive. A parallel guide is not necessary, since the parallel alignment can also be taken over via the stop element. For this purpose, the opposite-lying stop surfaces of the stop element can run parallel to one another.

In another advantageous embodiment of the invention, the stop element has a gas inlet, a gas outlet and/or a chamber. Preferably, the metal filament or wire package is disposed inside this chamber during the heat treatment. The gas connections are in fluid communication with the chamber. Protective gas, such as, e.g., argon and/or helium, can be delivered into the chamber through the gas connections. In an advantageous way, this offers an integrated protective gas shielding with very little gas consumption. Further, the protective gas can additionally accelerate the cooling process.

Additional advantageous embodiments of the invention are given in the dependent claims.

BRIEF DESCRIPTION OF THE DRAWING FIGURES

Preferred exemplary embodiments of the invention are described in detail below on the basis of the schematic drawings. Here:

DESCRIPTION OF THE INVENTION

Figure 1:
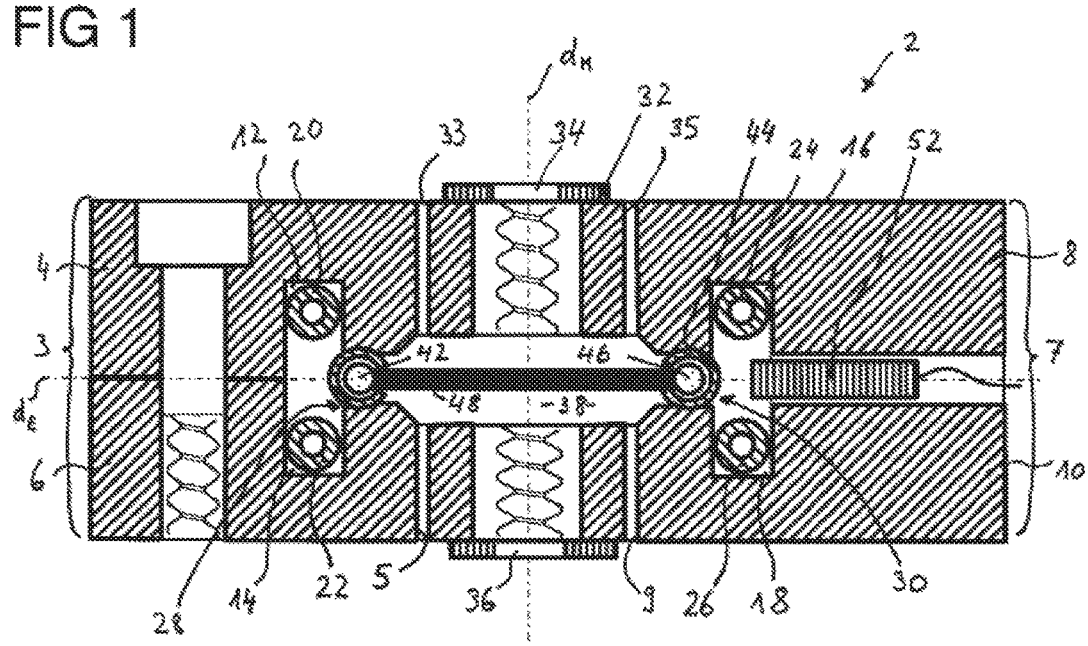
FIG. 1 shows a section through the device according to the invention, wherein the lay angle of the clamped brush seal is zero.

FIG. 1 shows a vertical section through the device 2 according to the invention. On the left in FIG. 1, the device comprises a first pair 3 of fastening jaws 4 and 6 disposed one above the other, and on the right in the figure, a second pair 7 of fastening jaws 8 and 10 disposed one above the other. Each fastening jaw 4 to 10 has a coil uptake 12 to 18, in each of which is disposed an induction coil 20 to 26. The pair 3 of fastening jaws 4 and 6 on the left in FIG. 1 has a first brush uptake 28 to the right of the two coil uptakes 12 and 14. A first, preferably c-shaped clamping strip 40, which is crimped over a first wire core 42, is clamped in the first brush uptake 28. The outer diameter of the first clamping strip 40 corresponds to the inner diameter of the first brush uptake 28. The pair 7 of fastening jaws 8 and 10 on the right in FIG. 1 has a second brush uptake 30 to the left of the two coil uptakes 16 and 18. A second, preferably c-shaped clamping strip 44, which is crimped over a second wire core 46, is clamped in the second brush uptake 30. The outer diameter of the second clamping strip 44 corresponds to the inner diameter of the second brush uptake 30. The metal filament or wire package 48 runs between the two wire cores 42 and 46, wherein the individual, particularly metal filament or wire 50 is wound alternately around the wire cores 42 and 46. The two clamping strips 40 and 44 fix the metal filament or wire package 48 on the corresponding wire core 42 or 46. The metal filament or wire package 48 and the two clamping strips 40 and 44 hereby define the wire plane $d_E$, which runs horizontally in FIG. 1. In this exemplary embodiment, the separating surfaces of the fastening jaws 4 to 10 lie in the wire plane $d_E$.

It should be noted that preferably the diameter of the metal filament or wire 50 is smaller than the diameter of at least one of the two wire cores 42 and 46. Preferably, the diameters of the two wire cores 42 and 46 are identical.

A stop element 32 is disposed between the two pairs of fastening jaws 4 to 10. In FIG. 1 at the top, the stop element 32 has a gas inlet 34 and in FIG. 1 at the bottom, it has a gas outlet 36. A chamber 38 is inserted in the stop element 32 between the two gas connections 34 and 36. The stop element 32 is disposed between the fastening jaws 4 to 10 in such a way that the metal filament or wire package 48 runs inside the chamber 38. Further, in this case, the stop surface 5 to the right of the left-side fastening jaws 4 and 6 is distanced from the left-side stop surface 33 of the stop element 32. Further, in this case, the left-side stop surface 9 of the right-side fastening jaws 8 and 10 is distanced from the right-side stop surface 35 of the stop element 32. Preferably, the stop surfaces 5, 9, 33 and 35 run parallel to one another. If this is the case, then a parallel guide (not shown) can be dispensed with.

Further, at least one temperature sensor 52 is disposed in the right-side pair 7 of fastening jaws 8 and 10 in the vicinity of the induction coils 16 and 18.

After the pair of brush seals plus the two clamping strips 40 and 44 and the two wire cores 42 and 46 are clamped in the fastening jaws 4 to 10, the induction coils 20 to 26 are turned on. In this case, protective gas can be delivered into the chamber 38 via the gas connections 34 and 36, in order to protect the metal material of the brush seal against oxidation. The temperature sensor 52 measures the temperature that arises. The heat treatment can be controlled in this way, but it can also be regulated. After reaching the target temperature, for example, the right-side pair of fastening jaws 8 and 10 are displaced.

Figure 2:
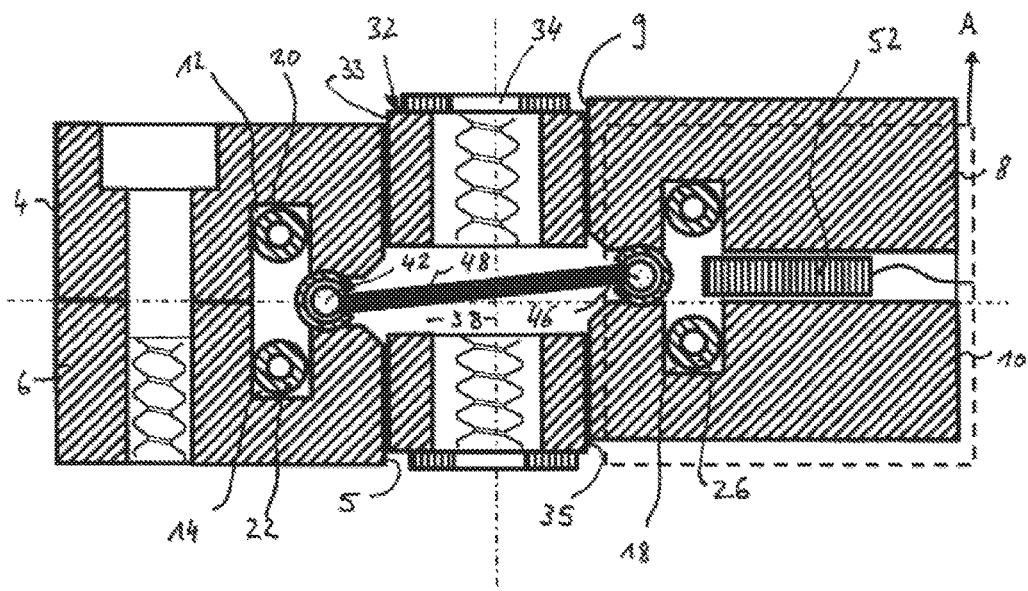
FIG. 2 shows a section through the device according to the invention, wherein the bristles are inclined in the axial direction.
Figure 3:
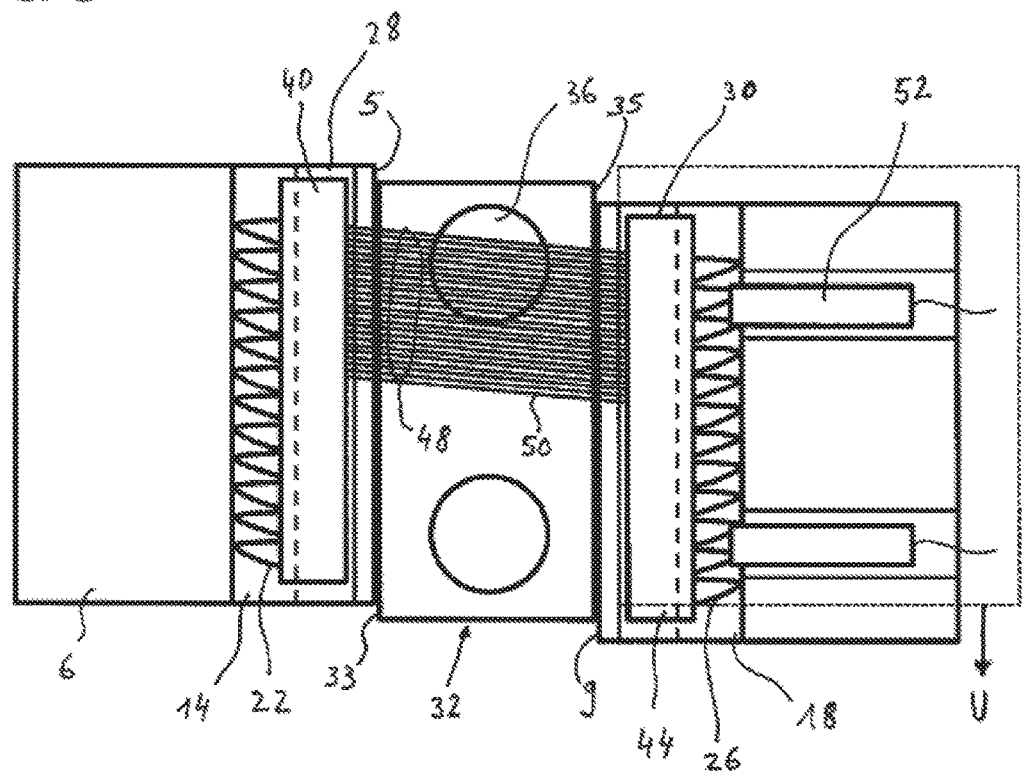
FIG. 3 shows a top view onto the wire plane of the device, wherein the bristles are inclined in the peripheral direction.

This is shown in FIGS. 2 and 3.

FIG. 2 also shows a vertical section through the device 2. In comparison to the initial position, as it is illustrated in FIG. 1, in FIG. 2, the right-side pair 7 of fastening jaws 8 and 10 was displaced perpendicular to the wire plane $d_E$ up to the left-side stop surface 33 of the stop element 32 and rests against the right-side stop surface 5 of the left-side fastening pair 4 and 6, and the right-side stop surface 35 of the stop element 32 rests against the left-side stop surface 9 of the right-side fastening pair 8 and 10. The frame indicated by dashes shows the original position of the right-side fastening pair 8 and 10 in FIG. 1. In this direction of displacement, the metal filament or wire package is bent in the axial direction A. The axial direction refers to the later installed position in an engine.

FIG. 3 shows a horizontal section along the wire plane $d_E$. In this case, only the lower elements of the fastening device 2 can be recognized from FIG. 1. The lower coil 22 on the left side is disposed in the lower left uptake 14 in the left-side lower fastening jaw 6. The lower coil 26 on the right side is disposed in the lower right uptake 18 in the right-side lower fastening jaw 10. Moreover, two temperature sensors 52 can be recognized. In comparison to the initial position, as it is illustrated in FIG. 1, now, in FIG. 3, the fastening jaw 10 on the right is displaced along the wire plane $d_E$ until the left-side stop surface 33 of stop element 32 rests against the right-side stop surface 5 of the fastening jaw 6 on the left, and the right-side stop surface 35 of the stop element 32 rests against the left-side stop surface 9 of the fastening jaw 10 on the right. It should be noted that the plane of the page coincides with the wire plane $d_E$. The frame with the dashed line depicts the initial position of the fastening jaw 10 on the right in FIG. 1. In this case, the metal filament or wire package is bent in the peripheral direction U. The peripheral direction U refers to the later installed position in an engine.

Only the fastening pair 7 on the right was displaced in the two embodiment examples. Of course, the fastening pair 5 on the left can also be displaced. The fastening jaws 4 to 10 can also be displaced obliquely to the wire plane, so that the bristles are then bent both in the peripheral direction and in the axial direction. Therefore, when the bristles are obliquely positioned, a seal can be manufactured with an axial lay angle (see FIG. 3) as well as a radial lay angle (see FIG. 2) in a single process step.

After the position lay angle has been set, the pair of brush seals is cooled to room temperature. The metal filament or wire package 48 can be severed centrally along the plane $d_M$, so that two brush seals with bristles of the same length are formed.

What is claimed is:

1. A method for manufacturing brush seals with obliquely positioned bristles, comprising the steps of:
 a.) winding a metal filament or wire comprising a material for bristles over two wire cores disposed at a distance from and running parallel to one another, to form a tightly packed metal filament or wire package;
 b.) fastening the metal filament or wire package to at least one wire core;
 c.) local heating of the region around at least one of the two wire cores by at least one induction coil disposed in at least one fastening jaw; and
 d.) displacing at least one of the two wire cores so as to obtain a brush seal with obliquely positioned bristles made of the metal bristle material with the tightly packed metal filament or wire package.

2. The method according to claim 1, wherein the induction coil is driven with a frequency in the eddy current.

3. The method according to claim 1, wherein, in step b.), the fastening is carried out by welding, bonding, or form-fit joining, and/or in that during the displacement in step d.), a brush seal can be manufactured with both an axial as well as a radial position lay angle in one process step.

4. The method according to claim 1, wherein, in step b.), the fastening is carried out by crimping at least one clamping strip over at least one wire core.

5. The method according to claim 1, wherein, after step b.) and before step d.), at least one wire core is fixed to a fastening jaw.

6. The method according to claim 1, wherein, in step c.), during the heating of the metal filament or wire package, at least one wire core and/or at least one clamping strip is surrounded by a protective gas.

7. The method according to claim 1, wherein, in step d.), at least one wire core is displaced within a wire plane and/or perpendicular to a wire plane.

8. The method according to claim 1, wherein, after step d.), the metal filament or wire package, at least one wire core, and/or at least one clamping strip are cooled to room temperature.

9. The method according to claim 1, wherein, after step d.), the metal filament or wire package disposed between the two wire cores is severed.

* * * * *